(12) United States Patent
Mangal et al.

(10) Patent No.: US 11,501,343 B2
(45) Date of Patent: Nov. 15, 2022

(54) SYSTEM AND METHOD TO CHARGE A PENALTY FEE TO AN UNCOOPERATIVE CLIENT OF AN AUTOMATED-TAXI

(71) Applicant: Motional AD LLC, Boston, MA (US)

(72) Inventors: Nandita Mangal, Palo Alto, CA (US); Michael H. Laur, Mission Viejo, CA (US)

(73) Assignee: Motional AD LLC, Boston, MA (US)

( * ) Notice: Subject to any disclaimer, the term of this patent is extended or adjusted under 35 U.S.C. 154(b) by 261 days.

(21) Appl. No.: 16/043,951

(22) Filed: Jul. 24, 2018

(65) Prior Publication Data
US 2020/0027140 A1 Jan. 23, 2020

Related U.S. Application Data

(60) Provisional application No. 62/702,036, filed on Jul. 23, 2018.

(51) Int. Cl.
*G06Q 30/02* (2012.01)
*G06Q 50/30* (2012.01)
(Continued)

(52) U.S. Cl.
CPC ....... *G06Q 30/0283* (2013.01); *G05D 1/0088* (2013.01); *G06Q 50/30* (2013.01); *G06V 20/597* (2022.01); *G05D 2201/0213* (2013.01)

(58) Field of Classification Search
CPC ............................ G06Q 50/30; G06Q 30/0283
(Continued)

(56) References Cited

U.S. PATENT DOCUMENTS 9,878,689 B1 * 1/2018 Jimenez ............ B60R 21/01544
10,303,961 B1 * 5/2019 Stoffel ............... G01C 21/3602
(Continued)

FOREIGN PATENT DOCUMENTS

DE 102017200432 7/2018
WO WO-2015090326 A1 * 6/2015 ............. A45C 13/18

OTHER PUBLICATIONS

Real Time Onboard Luggage Optimization. Feb. 7, 2018. IP.com PAD, The IP.com Journal. pp. 1-6. https://priorart.ip.com/IPCOM/000252751. (Year: 2018).*

(Continued)

*Primary Examiner* — Jeff Zimmerman
*Assistant Examiner* — Hunter A Molnar
(74) *Attorney, Agent, or Firm* — Fish & Richardson P.C.

(57) ABSTRACT

A system for operating an automated-taxi includes a perception-sensor, a communication-device, and a controller-circuit. The perception-sensor is operable to determine a location of an object aboard an automated-taxi. The communication-device is operable to communicate with a client of the automated-taxi. The controller-circuit is in communication with the perception-sensor and the communication-device. The controller-circuit is configured to determine that the location of the object is not in compliance with an operational-requirement of the automated-taxi based on signals or information from the perception-sensor, and operate the communication-device to send a message that indicates the client will be charged a fee for failing to re-locate the object so that the location of the object is in compliance with the operational-requirement of the automated-taxi.

21 Claims, 3 Drawing Sheets

(51) Int. Cl.
*G05D 1/00* (2006.01)
*G06V 20/59* (2022.01)

(58) Field of Classification Search
USPC .......................................................... 705/400
See application file for complete search history.

(56) References Cited

U.S. PATENT DOCUMENTS

| | | |
|---|---|---|
| 2002/0089157 A1 | 7/2002 | Breed et al. |
| 2012/0217091 A1* | 8/2012 | Baillargeon ............ B66F 11/04 182/18 |
| 2014/0077952 A1* | 3/2014 | Boss .................. G06Q 10/0832 340/572.1 |
| 2014/0100892 A1* | 4/2014 | Collopy ................. G06Q 30/04 705/4 |
| 2018/0114217 A1* | 4/2018 | Kohli ............... G06K 19/06037 |
| 2018/0136655 A1* | 5/2018 | Kim ..................... G05D 1/0088 |
| 2019/0005441 A1* | 1/2019 | Savian ................. G06Q 10/087 |
| 2019/0168711 A1* | 6/2019 | Oesterling .............. G06F 16/51 |
| 2020/0130678 A1* | 4/2020 | Gotoda .................. G08G 1/166 |
| 2020/0394746 A1* | 12/2020 | Krishnamurthy .... G06Q 10/083 |

OTHER PUBLICATIONS

European Search Report for Application No. 19185604.6, European Patent Office, dated Oct. 8, 2019.
EP Extended European Search Report and Written Opinion in European Appln. No. 19185604.6, dated Oct. 24, 2019, 9 pages.

* cited by examiner

SYSTEM AND METHOD TO CHARGE A PENALTY FEE TO AN UNCOOPERATIVE CLIENT OF AN AUTOMATED-TAXI

TECHNICAL FIELD OF INVENTION

This disclosure generally relates to a system for operating an automated-taxi, and more particularly relates to a system that sends a message that indicates that a client will be charged a fee for failing to re-locate an object that is not in compliance with an operational-requirement of the automated-taxi.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
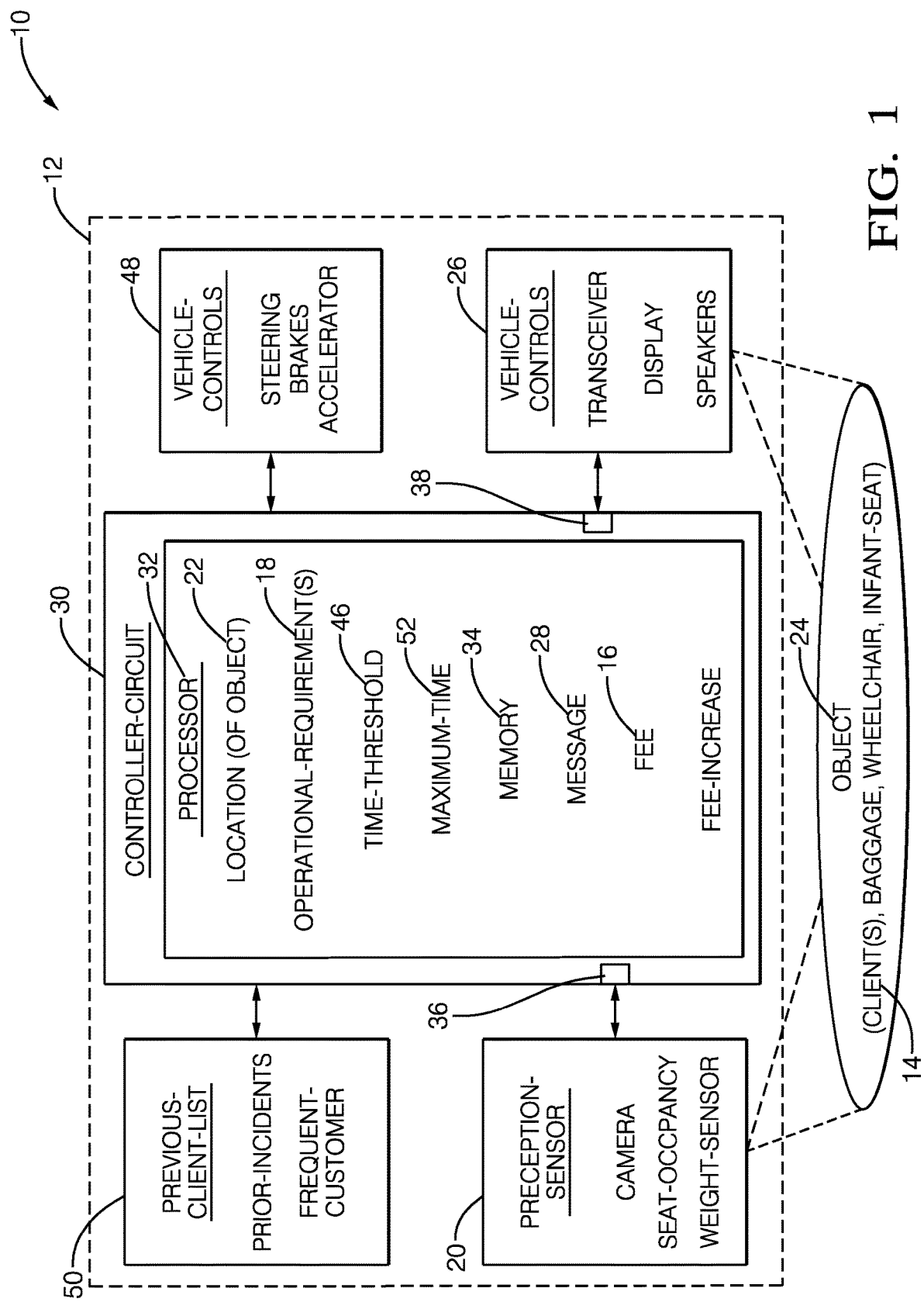
FIG. 1 is a diagram of a system for operating a vehicle in accordance with one embodiment.

FIG. 1 illustrates a non-limiting example of a system 10 generally intended for operating an automated-taxi 12, which may be referred to by some as an automated-mobility-on-demand (AMOD) vehicle. The automated-taxi 12 may be characterized as an automated vehicle. As used herein, the term automated vehicle may apply to instances when the automated-taxi 12 is being operated in an automated-mode, i.e. a fully autonomous mode, where a client 14 (e.g. a passenger or customer) of the automated-taxi 12 may do little more than designate a destination to operate the automated-taxi 12. However, full automation is not a requirement. It is contemplated that the teachings presented herein are useful when the automated-taxi 12 is operated in a manual-mode where the degree or level of automation may be little more than providing an audible or visual warning to a human-operator (e.g. a person other than the client 14) who is generally in control of the steering, accelerator, and brakes of the automated-taxi 12.

As will be explained in more detail below, one aspect of the system 10 is that the client 14 of the automated-taxi 12 or AMOD may be charged a fee 16 (i.e. a surcharge, penalty, or fine) for failing to comply with an operational-requirement 18. The fee may be added on the normal fare charge, or may be a separate additional fee that is charged separately so the fact that the fee 16 was charged, and optionally an explanation as to why the fee 16 was charged, will be clear and obvious to the client 14. As used herein, the operational-requirement 18 is a guideline or rule by which the automated-taxi 12 is supposed to operate that can be violated by the client 14. By way of example and not limitation, the operational-requirement 18 may be a rule that specifies where luggage or baggage must be stored within the interior or a trunk-area of the automated-taxi, where an infant-seat must be properly secured, or where a wheelchair must be positioned/secured. If the system 10 determines that the client 14 has violated one or more instances of the operational-requirement 18, the client 14 may be charged the fee 16.

The system 10 includes a perception-sensor 20 operable to determine a location 22 of an object 24 aboard the automated-taxi 12. The perception-sensor 20 may consist of or include, but is not limited to a camera, a radar-unit, a lidar-unit, a weight-detector (indicates the weight of an instance of the object 24 in a seat and/or on a floor of the automated-taxi), a seat-occupancy-detector (indicates the presence and optionally the size and/or the weight of anything occupying a seat), or any combination thereof. The object 24 may consist of or include, but is not limited to, the client 14 and/or other persons or animals, luggage or baggage, an infant-seat, and/or a wheel-chair. The location 22 of an instance of the object 24 may be in an area commonly referred to as the interior or cabin of the automated-taxi 12, and/or a trunk-area generally suited to securing cargo such as luggage, baggage, or other goods placed aboard or brought aboard the automated-taxi 12 by the client 14.

The system 10 includes a communication-device 26 that is operable to communicate with the client 14 of the automated-taxi 12. The communication-device 26 may include or consist of, but is not limited to, a transceiver (e.g. cellular-network, blue-tooth, wi-fi, etc.) in communication with, for example a smart-phone of client; a general-purpose display in the automated-taxi, and/or a speaker used to convey a voice-message to the client 14. One aspect of the system 10 is that the communication-device 26 may be used to convey to the client 14 a message 28 that the location 22 of one or more instances of the object 24 are not in compliance with the operational-requirement 18, and optionally that the fee 16 may be charged to the client 14 of the object 24 is not moved to a different location so that the location 22 of all objects complies with all the operational-requirements 18.

The system 10 includes a controller-circuit 30 in communication with the perception-sensor 20 via an input 36 and the communication-device 26 via an output 38. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30. The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The one or more routines may be executed by the controller 30 or the processor 32 to perform steps for determining compliance to the operational-requirements 18 based on signals received by the controller 30 from the perception-sensor 20 as described herein.

Figure 2:
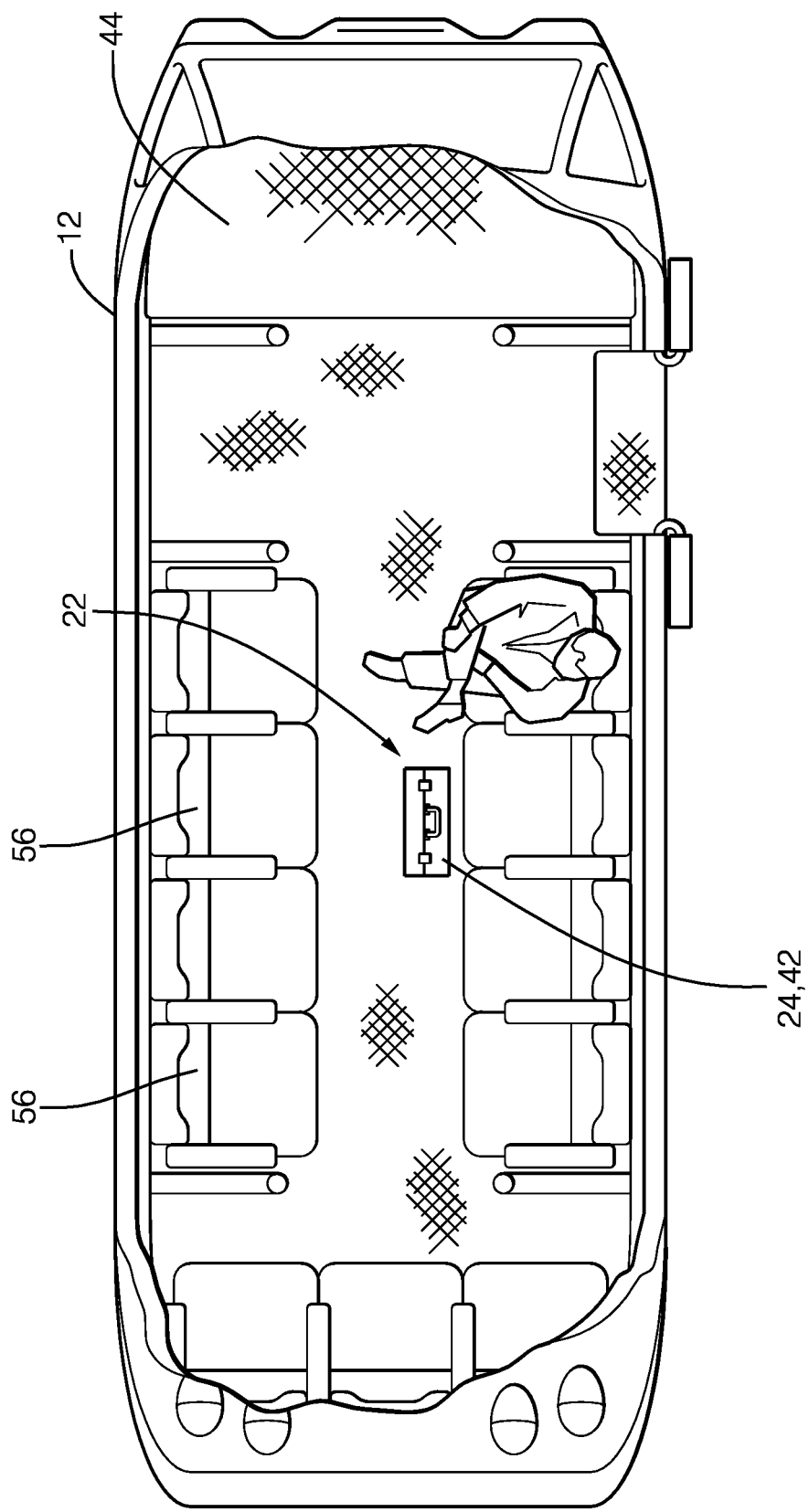
FIG. 2 is a scenario encountered by the system of FIG. 1 in accordance with one embodiment.

FIG. 2 illustrates a non-limiting example of a scenario 40 where the client 14 has boarded the automated-taxi 12, and an instance of the object 24 is a suitcase 42, i.e. is baggage or luggage. In this instance, a non-limiting example of the operational-requirement 18 may be that any baggage or luggage that not held by the client 14 and is bigger that a size-threshold (e.g. any dimension greater than 300 mm) and/or heavier than a weight-threshold (e.g. 5 kg) must be stowed in a cargo-area 44 of the automated-taxi 12.

Accordingly, the controller-circuit 30 is configured to use the perception-sensor 20 to determine the location 22, and optionally the size and/or the weight of the object 24 (whatever the object 24 may be, including the client 14 or other persons), and consult or access the operational-requirement 18 to determine if or that the location 22 of the object 24 is not in compliance with an operational-requirement 18. In the example shown in FIG. 2, the camera (not shown) may be used by the controller 30 to determine that the suitcase 42 is larger than the size-threshold, and/or used the weight-sensor to determine that the suitcase 42 is heavier than the weight-threshold. Other non-limiting examples of non-compliance with the operational-requirement 18 are an infant not seated/secured in an infant-seat, or an infant-seat not in proper location, e.g. on the floor rather than secured to one of the seats 56.

The controller 30 (or the processor 32) is configured to operate the communication-device 26 (FIG. 1) to send a message 28 via the communication-device 38 that indicates (i.e. warns) the client 14 that the client 14 may or will be charged the fee 16 for failing to re-locate the object 24 (e.g. put the suitcase 42 in the cargo-area 44) so that the location 22 of the object 24 is in compliance with the operational-requirement 18 of the automated-taxi 12.

It is contemplated that the client 14 will be allowed some amount of time to move the object 24 to avoid the fee 16. That is, the system 10 or the controller 30 or the processor 32 may charge the fee 16 if client 14 is too slow to relocate the object 24 after the message 28 is received by the client 14 because the automated-taxi 12 has been unnecessarily or unreasonably delayed by the inaction of the client 14. In other words, the controller-circuit 30 charges the fee 16 in response to a determination that the object 24 (e.g. the suitcase 42) was not relocated in less time than a time-threshold 46, e.g. fifteen seconds (15 s).

The system 10 may be configured so the automated-taxi 12 does not move to transport the client 14 until after everything is in compliance with the operational-requirements 18. Accordingly, the system 10 may include vehicle-controls 48 (e.g. steering, accelerator, brakes) used by the controller-circuit 30 (or the processor 32) to operate (i.e. drive) the automated-taxi 12, and the controller-circuit 30 is configured to wait to operate the automated-taxi 12, i.e. is configured to keep the automated-taxi 12 stationary, until the location 22 of the object 24 is in compliance with the operational-requirement 18 of the automated-taxi 12. It is contemplated that there may be instances when the client 14 refuses to comply with the operational-requirement 18. One option is to not allow any additional passengers on board, and charge the client 14 an amount of money equal to the fares that would be received if the automated-taxi was full. Another option is to call the police or operate the automated-taxi to a police station.

The system 10 or the controller 30 or the processor 32 may also be configured to increase the fee 16 if client 14 is a repeat offender. For example, the system 10 may include a previous-client-list 50 that has a record of prior incidents with the client 14. If the client 14 on multiple occasions does the same action that results in non-compliance with the operational-requirements 18, the controller-circuit 30 may increase the fee 16 in response to a determination that the client 14 was sent the same message previously. Alternatively, the system 10 may act to refuse to authorize the client 14 to board the automated-taxi 12 if the client as repeatedly caused problems by repeatedly failing to comply with the operational-requirements 18.

Figure 3:
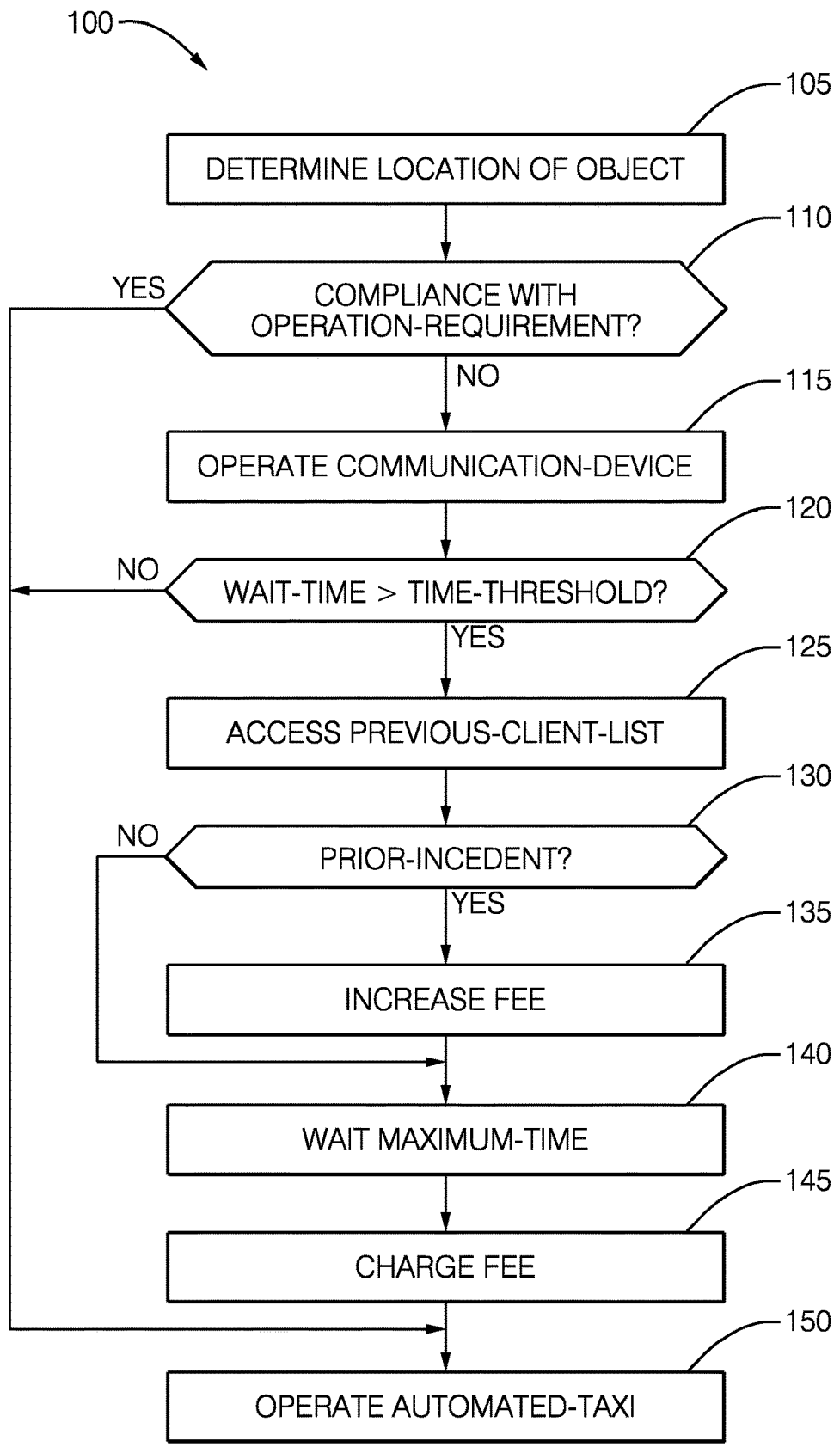
FIG. 3 is a method of operating the system of FIG. 1 in accordance with one embodiment.

FIG. 3 illustrates a non-limiting example of a method 100 for operating an automated-taxi 12.

Step 105, DETERMINE LOCATION OF OBJECT, may include operating, for example, a camera, a weight detector, or a seat-occupancy detector, which are part(s) of the perception-sensor 20, to indicate where (the location 22) within the automated-taxi 12 instances of the object 24 are located, objects such as the client or other clients, baggage or luggage, a wheelchair, and/or an infant-seat.

Step 110, COMPLIANCE WITH OPERATION-REQUIREMENT?, may include determining, with or using the perception-sensor 20, that the location 22 of an object 24 aboard an automated-taxi 12 is or is not in compliance with an operational-requirement 18 of the automated-taxi 12. As an example of non-compliance, the object 24 may be luggage that is too large or too heavy to not be stored in the cargo-area 44, or a wheelchair is not parked where there are securing means to secure the wheelchair to the automated-taxi 12. If all objects are in compliance, the method 100 proceeds to step 150 to operate the automated-taxi. However, if one or more of the objects 24 are not in compliance, then actions are taken to correct the problem, starting with notifying the client 14 by way of step 115.

Step 115, OPERATE COMMUNICATION-DEVICE, may include operating the communication-device 26 (e.g. a transceiver, a display and/or a speaker) to send a message 28 to a client 14 that indicates the client 14 will be charged a fee 16 if the client 14 fails to re-locate the object 24 so that the location 22 of the object 24 is in compliance with the operational-requirement 18 of the automated-taxi 12. By way of example and not limitation, the message 28 emitted from the speaker may be "All large luggage must be stowed in the cargo-area or held in your lap", or "The object on the walkway of this vehicle must be moved to the cargo-area", which may be repeated, and eventually followed with "Failure to immediately stow all luggage in the cargo area will result in an additional fee being charged to your credit card and/or a termination of transportation services." Alternatively, or additionally, a light may be illuminated and/or a message may be shown on a display, which may also show a timer counting down.

Step 120, WAIT-TIME>TIME-THRESHOLD?, may include waiting, i.e. keeping the automated-taxi 12 stationary until the wait-time exceeds the time-threshold 46, e.g. fifteen seconds, before taking any further action. That is, for example, the client 14 will have fifteen seconds to at least initiate some action that seems directed to resolving the lack of compliance with operational-requirement 18 of the automated-taxi 12.

Step 125, ACCESS PREVIOUS-CLIENT-LIST, may include accessing a previous-client-list 50 to determine if the client 14 has repeatedly, i.e. on different occasions, committed the same violation of the operational-requirements 18. The previous-client-list 50 may also include information regarding a 'frequent-flyer' status of the client 14 and/or a security-authorization of the client 14, which may influence subsequent steps such as how much the fee 16 is increased in response to the client 14 failing to act.

Step 130, PRIOR INCIDENT?, may include comparing the number of times the client 14 was notified on prior trips on the automated-taxi 12 that something was not in compliance with the operational-requirements 18. For example, if the last three times the client 14 boarded the automated-taxi 12 the client 14 placed a large suitcase in the walkway of the automated-taxi 12 rather than the cargo-area 44, then that repeated offense may result in an increase to the fee 16. If this is only the first or second time this offense occurred, then there may be no increase of the fee 16.

Step 135, INCREASE FEE, may include increasing the fee in response to a determination that the client was sent the same message previously. That is, if outcome of step 130 is YES, that this is a multiple repeat of a prior offense, then the fee 16 may be increased, e.g. doubled (2x).

Step 140, WAIT MAXIMUM-TIME, may include waiting to operate the automated-taxi and/or assess the fee 16 until the object 24 is in compliance with the operational-requirement 18 of the automated-taxi 12. After the maximum-time 52, e.g. forty-five seconds (45 s) has expired, many options are contemplated to deal with the client 14 continuing to fail to comply with the operational-requirements 18. For example, the client 14 may be asked to get off or out of the automated-taxi 12, or the automated-taxi 12 may move away from the area where others are waiting to board, park in a safe location possibly nearby a police officer, and another automated taxi may arrive to transport the cooperative clients.

Step 145, CHARGE FEE, may include charging the fee 16 (either the base fee or an increased fee that had a fee-increase 54 applied in response to a determination that the client 14 is especially uncooperative) in response to a determination that the object 24 was not relocated in less time than the time-threshold 46 or the maximum-time 52. The fee 16 may be charged to a credit-card of the client 14, or a bill may be sent as part of a monthly billing activity.

Step 150, OPERATE AUTOMATED-TAXI, may include the controller 30 or the processor 32 operating the vehicle-controls 48 to operate (i.e. drive) the automated-taxi 12 to a destination specified by the client, or to follow a predefined route or loop of the automated-taxi 12. The algorithms/programs used to operate the automated-taxi 12 in an autonomous (i.e. driverless) manner are well-known.

Described herein is a first device 30 that includes one or more processors 32; memory 34; and one or more programs 105-150 stored in memory 34. The one or more programs 105-150 including instructions for performing all or part of the method 100. Also, described herein is a non-transitory computer-readable storage-medium 34 that includes one or more programs 105-150 for execution by one or more processors 32 of a first device 30, the one or more programs 105-150 including instructions which, when executed by the one or more processors 32, cause the first device to perform all or part of the method 100.

Accordingly, a system 10, a controller 30 for the system 10, and a method of operating the system 10 are provided. The operational-requirements 18 may be established in an attempt to increase the safety of the client 14 and other passengers. Charging the fee 16 to the client 14 who is uncooperative with regard to the operational-requirements 18 is but one way to encourage the client 14 to behave in a manner that is in accordance with the operational-requirements 18.

While this invention has been described in terms of the preferred embodiments thereof, it is not intended to be so limited, but rather only to the extent set forth in the claims that follow.

We claim:

1. A system for operating an automated-taxi, said system comprising:
   a perception-sensor operable to:
      obtain an image of an interior section of the automated-taxi;
      identify, using the image, an object that was brought aboard the automated-taxi by a client of the automated taxi; and
      determine, using the image, a location and at least one dimension of the object aboard the automated-taxi;
   a communication-device operable to communicate with the client of the automated-taxi; and
   a controller-circuit in communication with the perception-sensor and the communication-device, said controller-circuit configured to:
      determine that the at least one dimension of the object is greater than a specified threshold;
      upon determining that the at least one dimension of the object is greater than the specified threshold, determine that the location of the object is outside a storage area of the automated-taxi designated for storage of objects during movement of the automated-taxi;

operate the communication-device to send a message that indicates the client will be charged a fee unless the object is relocated to the designated storage area of the automated-taxi; and operate, based on a determination related to re-location of the object, vehicle-controls of the automated taxi.

2. The system in accordance with claim 1, wherein the controller-circuit charges the fee in response to a determination that the object was not relocated in less time than a time-threshold.

3. The system in accordance with claim 1, wherein the system includes a previous-client list, and the controller-circuit increases the fee in response to a determination that the client was sent the same message previously.

4. The system in accordance with claim 1, wherein the controller-circuit is configured to wait to operate the automated-taxi until the object is relocated to the designated storage area of the automated-taxi.

5. A controller-circuit for operating an automated-taxi, said controller-circuit comprising:

a controller-circuit input that is communicatively coupled with a perception-sensor, wherein the perception-sensor is operable to:

obtain an image of an interior section of the automated-taxi, and determine, using the image, a location and at least one dimension of an object that was brought aboard an automated-taxi by a client of the automated-taxi;

a controller-circuit output that is communicatively coupled with a communication-device, wherein the communication-device is operable to communicate with the client of the automated-taxi; and a processor in communication with the perception-sensor and the communication-device, said processor configured to:

determine that the at least one dimension of the object is greater than a specified threshold;

upon determining that the at least one dimension of the object is greater than the specified threshold, determine that the location of the object is outside a storage area of the automated-taxi designated for storage of objects during movement of the automated-taxi;

operate the communication-device to send a message that indicates the client will be charged a fee unless the object is relocated to the designated storage area of the automated-taxi; and operate, based on a determination related to re-location of the object, vehicle-controls of the automated taxi.

6. The controller-circuit in accordance with claim 5, wherein the controller-circuit charges the fee in response to a determination that the object was not relocated in less time than a time-threshold.

7. The controller-circuit in accordance with claim 5, wherein the controller-circuit is configured to access a previous-client-list, and the processor increases the fee in response to a determination that the client was sent the same message previously.

8. The controller-circuit in accordance with claim 5, wherein the controller-circuit is configured to wait to operate the automated-taxi until a re-location of the object to the designated storage area of the automated-taxi.

9. A method for operating an automated-taxi, said method comprising:

determining, using a perception-sensor, a location and at least one dimension of an object that was brought aboard an automated-taxi by a client of the automated-taxi;

determining, using a controller-circuit, that the at least one dimension of the object is greater than a specified threshold;

upon determining that the at least one dimension of the object is greater than the specified threshold, determining, using the controller-circuit that the location of the object aboard is outside a storage area of the automated-taxi designated for storage of objects during movement of the automated-taxi;

operating a communication-device to send a message to the client that indicates the client will be charged a fee unless the object is relocated to the designated storage area of the automated-taxi; and operating, by the controller-circuit, vehicle-controls of the automated taxi based on a determination related to re-location of the object.

10. The method in accordance with claim 9, wherein the method includes charging the fee in response to a determination that the object was not relocated in less time than a time-threshold.

11. The method in accordance with claim 9, wherein the method includes:

accessing a previous-client-list; and increasing the fee in response to a determination that the client was sent the same message previously.

12. The method in accordance with claim 9, wherein the method includes:

determining, by the perception-sensor, whether the object was re-located subsequent to sending the message to the client; and causing, by the controller-circuit, the vehicle-controls to not move the taxi until the location of the object is in the designated storage of the automated-taxi.

13. The system of claim 1, wherein the at least one dimension includes one of size or weight.

14. The system of claim 13, wherein the operational requirement of the automated-taxi specifies that objects having weights greater than a specified weight threshold or having sizes greater than a specified size threshold are to be stowed in a designated storage area in the interior of the automated-taxi.

15. The system of claim 14, wherein the determined location of the object is outside the designated storage area in the interior of the automated-taxi.

16. The controller-circuit of claim 5, wherein the at least one dimension includes one of size or weight.

17. The controller-circuit of claim 16, wherein the operational requirement of the automated-taxi specifies that objects having weights greater than a specified weight threshold or having sizes greater than a specified size threshold are to be stowed in a designated storage area in the interior of the automated-taxi.

18. The controller-circuit of claim 17, wherein the determined location of the object is outside the designated storage area in the interior of the automated-taxi.

19. The method of claim 9, wherein the at least one dimension includes one of size or weight.

20. The method of claim 19, wherein the operational requirement of the automated-taxi specifies that objects having weights greater than a specified weight threshold or having sizes greater than a specified size threshold are to be stowed in a designated storage area in the interior of the automated-taxi.

21. The method of claim 20, wherein the determined location of the object is outside the designated storage area in the interior of the automated-taxi.

* * * * *